(12) United States Patent
Yamamura et al.

(10) Patent No.: US 6,628,010 B2
(45) Date of Patent: Sep. 30, 2003

(54) PARALLEL POWER SYSTEM AND AN ELECTRONIC APPARATUS USING THE POWER SYSTEM

(75) Inventors: Hideho Yamamura, Oiso (JP); Mamoru Ogihara, Yamakita (JP); Naoki Maru, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/022,535

(22) Filed: Dec. 20, 2001

(65) Prior Publication Data

US 2002/0089865 A1 Jul. 11, 2002

(30) Foreign Application Priority Data

Dec. 21, 2000 (JP) ........................ 2000-389299

(51) Int. Cl.[7] ................................. H02J 1/10
(52) U.S. Cl. ...................................... 307/18
(58) Field of Search ............... 363/65, 71; 307/18, 307/42, 53, 71, 82; 361/627, 633, 637, 728, 729, 760, 807, 810, 819, 826

(56) References Cited

U.S. PATENT DOCUMENTS 6,285,546 B1 * 9/2001 Watarai et al. .............. 361/695
6,415,391 B1 * 7/2002 Naka .......................... 714/21

FOREIGN PATENT DOCUMENTS

| JP | 4-185231 | 7/1992 |
| JP | 9-93929 | 4/1997 |
| JP | 2000-137530 | 5/2000 |

* cited by examiner

Primary Examiner—Matthew Nguyen
(74) Attorney, Agent, or Firm—Mattingly, Stanger & Malur, P.C.

(57) ABSTRACT

A parallel power system is provided which can flexibly change output currents and the number of channels in short time and at low cost. A back board 7 of the parallel power system has connectors ECC and DCC for plug-in mounting power source circuits 1 to 6 and an electronic circuit 8. Terminals of the connectors DCC and EDC are connected by wiring lines HP. The power source circuits 1 to 3 constitute a first voltage channel by a power source line DH1 and a parallel operation control line PCH1 of the electronic circuit 8, whereas the power source circuits 4 to 6 constitute a second voltage channel by a power source line DH2 and a parallel operation control line PCH2. When a specification of the electronic circuit is to be changed, only the power source lines DH1 and DH2 and parallel operation control lines PCH1 and PCH2 are changed without changing the back board 7 and the like.

16 Claims, 8 Drawing Sheets

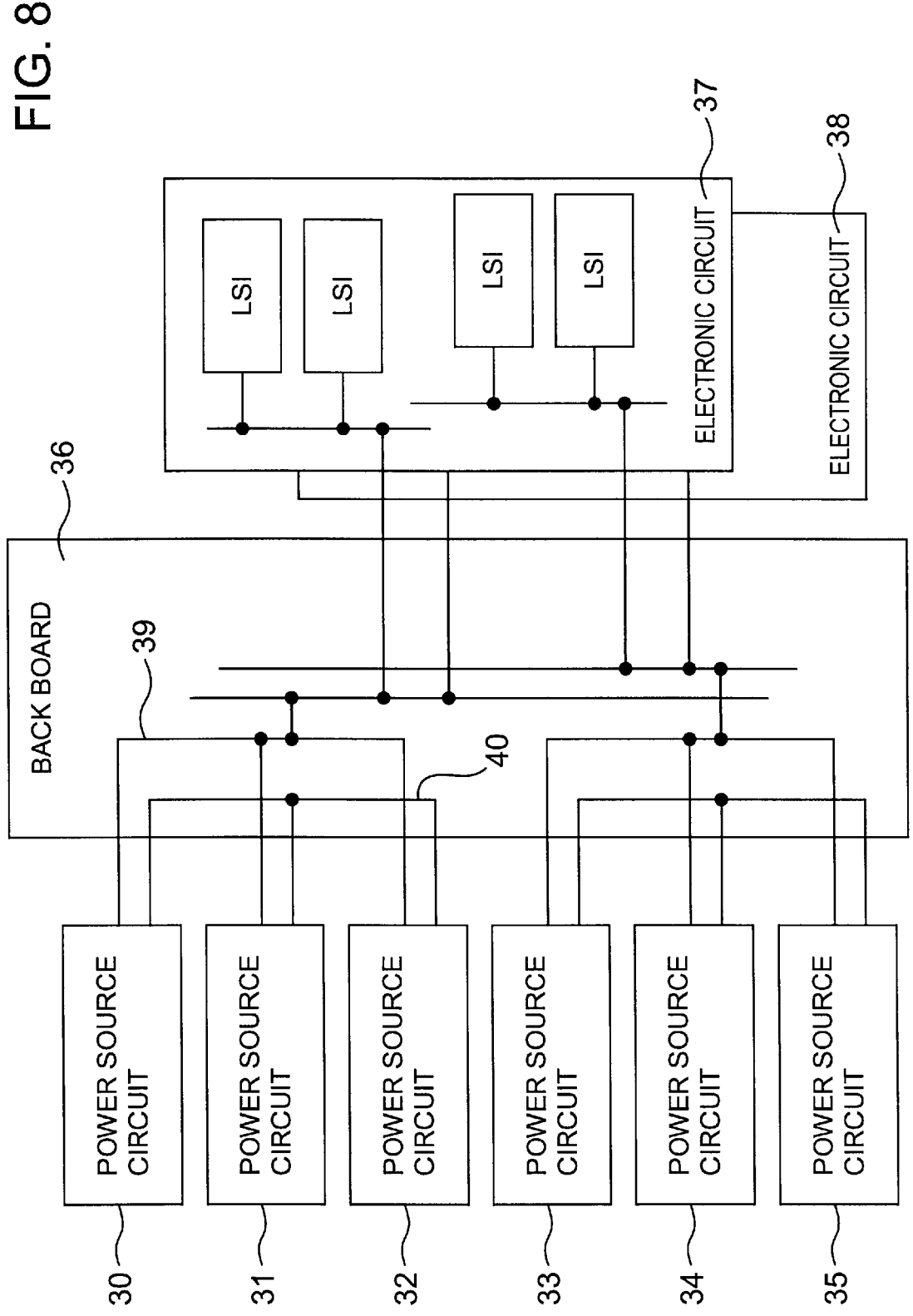

PARALLEL POWER SYSTEM AND AN ELECTRONIC APPARATUS USING THE POWER SYSTEM

BACKGROUND OF THE INVENTION

The present invention relates to power supply techniques for a power system, and more particularly to techniques effective for application to power supply by a parallel power system and an electronic apparatus using the parallel power system.

A parallel power system is used by various reasons and objectives. For example, such reasons include the case wherein a large capacity power system is configured by using power source circuits of small capacity, the case wherein the number of power source circuits are increased or reduced when necessary, the case wherein a redundancy structure is incorporated to improve reliability, and other cases.

As a power system of this type, a parallel power system is disclosed, for example, in JP-A-9-93929, which system supplies a d.c. power to a load by using a plurality of AC-DC switching power sources or DC-DC converter power sources of a redundancy structure.

SUMMARY OF THE INVENTION

The invention provides a parallel power system capable of flexibly changing output currents and the number of channels when a specification change of the parallel power system to be caused by a design change of an electronic circuit occurs. The invention can considerably reduce the cost and shorten the time for the change of the parallel power system. The invention can avoid discarding an electronic circuit equipped with the parallel power system so that the lifetime of the electronic apparatus can be prolonged.

According to an embodiment of the invention, a parallel power system is provided in which a plurality of power source circuits and one or plural electronic circuits are mounted on a back board and desired ones of power outputs of the plurality of power source circuits are connected in parallel to supply power to the electronic circuit. The back board has a plurality of feeder lines for independently supplying each power output of the plurality of power source circuits to the electronic circuit. The electronic circuit has power source lines for connecting in parallel desired ones of the feeder lines of the back board. If a plurality of power source circuits are divided into groups for different voltage channels, the electronic circuit has independent power source lines in correspondence with respective groups.

If each power source circuit has a function of outputting a control signal for controlling a parallel operation, the back board has a plurality of signal lines for independently transferring each control signal for the power source circuits to the electronic circuit. The electronic circuit has control lines for connecting in parallel desired ones of the signal lines of the back board. The electronic circuit may be structured by using a plurality of circuit boards.

Another embodiment of the invention provides a parallel power system for supplying power to the electronic circuit by connecting in parallel of desired ones of the power source circuits by using a feeder bus in place of the back board.

Another embodiment of the invention provides a parallel power system for supplying power to the electronic circuit by connecting in parallel of desired ones of the power source circuits by providing the electronic circuit with a parallel connection mechanism for connecting in parallel desired ones of the power source circuits.

BRIEF DESCRIPTION OF THE DRAWINGS

FIG. 8 is a diagram showing the structure of a parallel power system studied by the present inventor.

DESCRIPTION OF THE EMBODIMENTS

Figure 1:
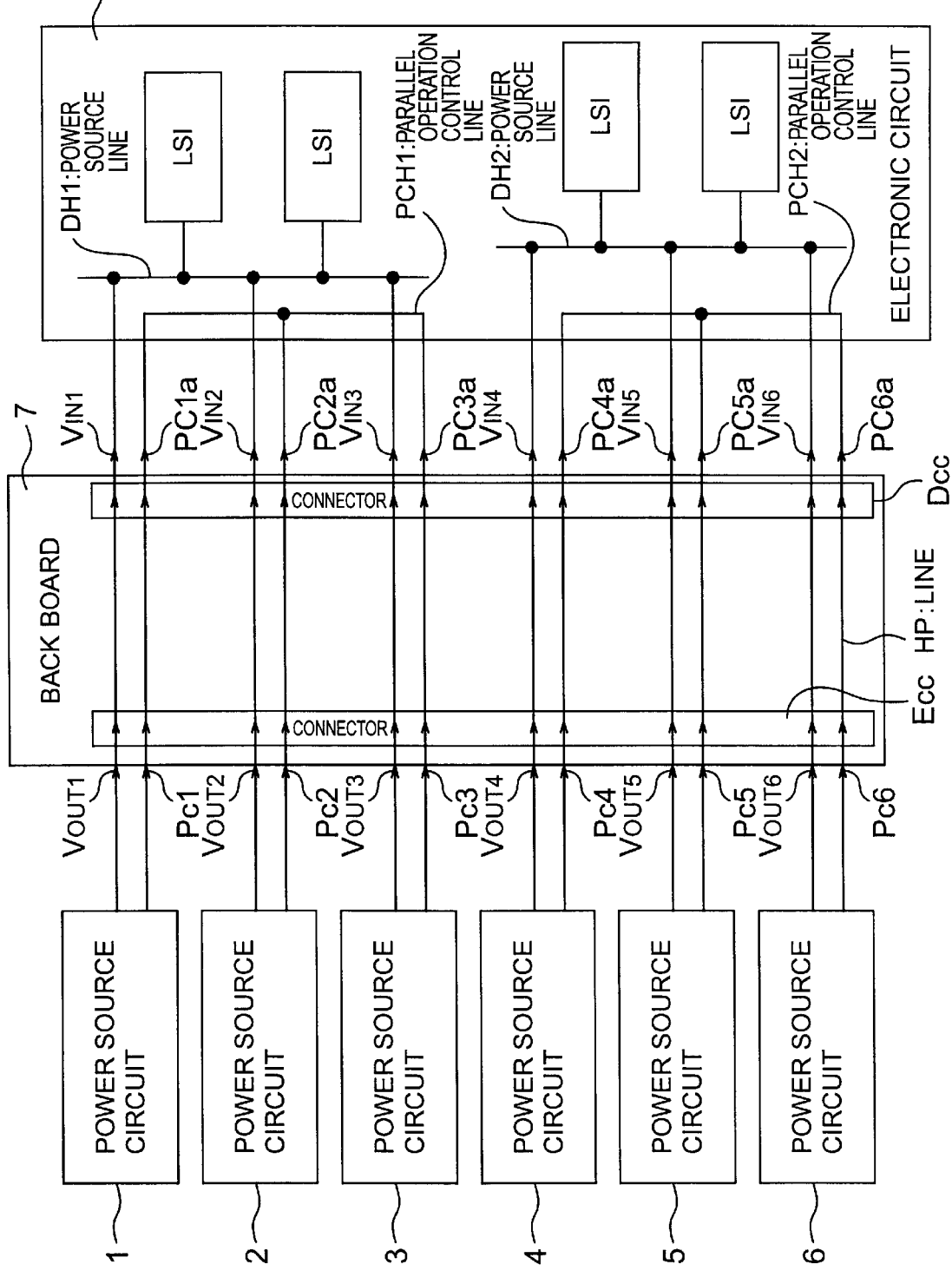
FIG. 1 is a diagram showing the structure of a parallel power system according to a first embodiment of the invention.

It is known that a power system for supplying power to an electronic apparatus such as a computer can be configured by connecting a plurality of power source circuits in parallel and running them in parallel.

Parallel connection of power source circuits is realized by connecting in parallel the output terminals, on-off control terminals when necessary, power input terminals, parallel operation control terminals or the like. Parallel operation is realized by running such power source circuits at the same time.

FIG. 8 is a block diagram showing an example of a parallel power system studied by the present inventor. In FIG. 8, the power system is constituted of power source circuits 30 to 35, a back board 36 and electronic circuits 37 and 38.

The output terminals of the power source circuits 30 to 32 are connected in common to a feeder line 39 on the back board. A group of parallel operation wires of the power source circuits 30 to 32, more specifically, remote sense lines and parallel operation signal lines, is connected in common to a parallel operation control wire 40 on the back board. Parallel connection and parallel operation of the power source circuits 30 to 32 constitute a first voltage channel.

The power source circuits 33 to 35 are also connected in parallel and operated in parallel to constitute a second voltage channel. A current capacity of each power source circuit is 10 A so that each voltage channel has a current capacity of 30 A. Each voltage channel can output a different voltage. Electronic circuits 37 and 38 are connected to the power system as its loads. Each electronic circuit has LSI and the like.

Such a power system for a parallel operation is used by various reasons and objectives. For example, such reasons include the case wherein a large capacity power system is configured by using power source circuits of a small capacity, the case wherein the number of power source circuits is increased or reduced when necessary, the case wherein a redundancy structure is incorporated to improve reliability, and other cases.

The present inventor has found the following problems associated with the connection techniques of the power system described above.

The current capacity or the number of voltage channels of a power system is requested to be changed in some cases. For example, the current capacity of the first voltage channel is requested to be changed from 30 A to 40 A, and that of the second voltage channel is requested to be changed from 30 A to 20A.

Specific reasons for a specification change may be a case wherein some of internal semiconductor devices are changed in order to improve or update electronic circuits of the electronic apparatus. Similarly, there is another case wherein the current capacity of the second voltage channel is requested to be changed from 30 A to 20 A and a new third voltage channel is requested to be installed.

When such a specification change occurs, the parallel power system is required to be reconfigured.

For example, in order to change the configuration of parallel connection, it is necessary to alter or exchange parallel connection parts or replace the back board. A back board is newly designed and manufactured, a replacement work is required and the old back board is discarded. This takes a cost and time.

With this specification change, a circuit may be unnecessarily re-designed and/or manufactured, an old electronic circuit is discarded and a replacement work is performed. If such change works are required for an already manufactured or shipped apparatus, it takes a very large cost and very long time and the change works may not be practical, because the back board is generally located at a deeper position of the structure of the apparatus. In such a case, the apparatus itself is discarded or although some portion of the apparatus may be reused, a most portion of the apparatus is discarded. It is a large social loss.

The present invention provides a parallel power system and an electronic apparatus capable of flexibly changing the output current and the number of channels in short time and at low cost when the specification of the power system is to be changed because of design change of electronic circuits.

Embodiments of the invention will be described with reference to the accompanying drawings.

Figure 2:
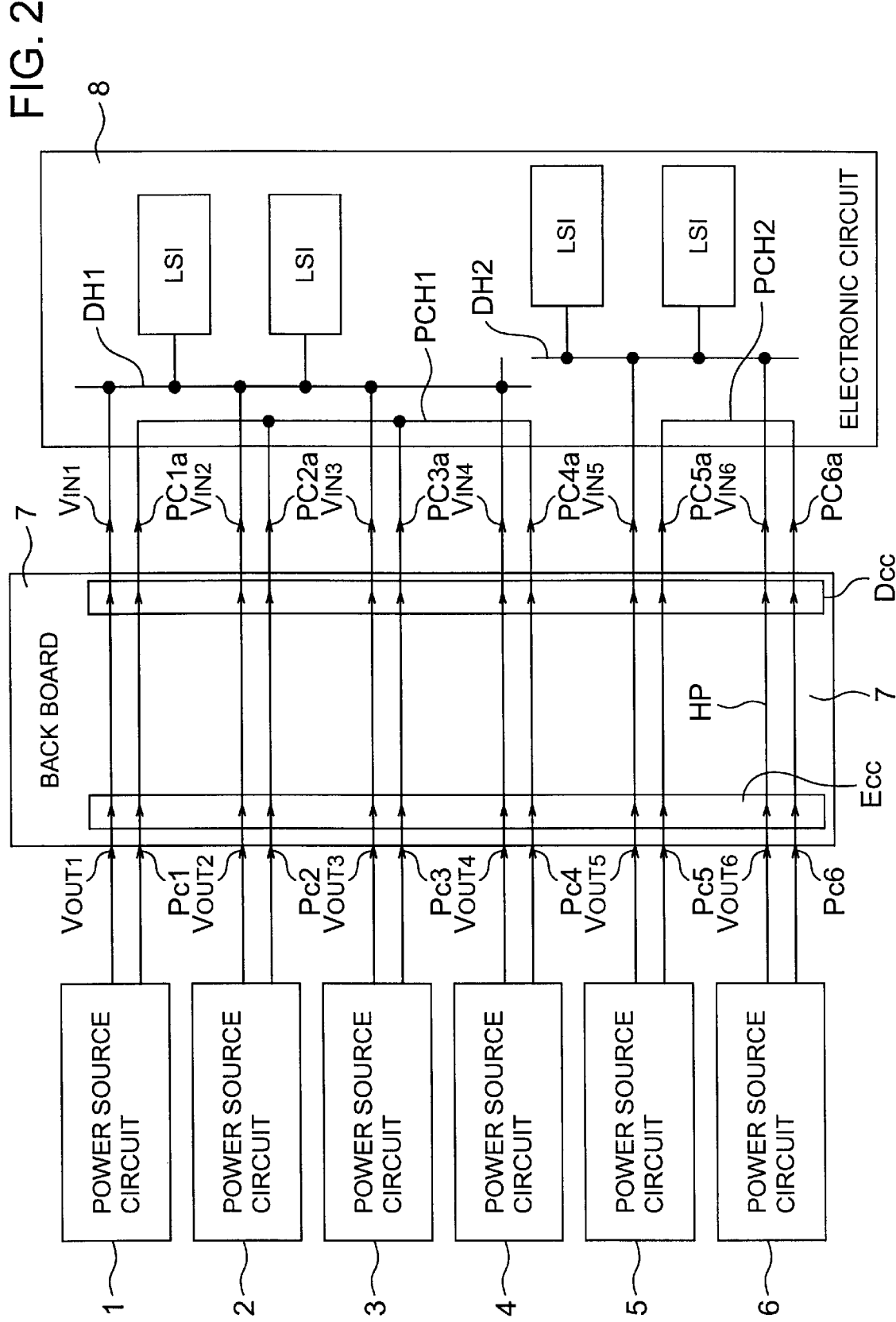
FIG. 2 is a diagram showing the structure of the parallel power system whose current capacity specification is changed.
Figure 3:
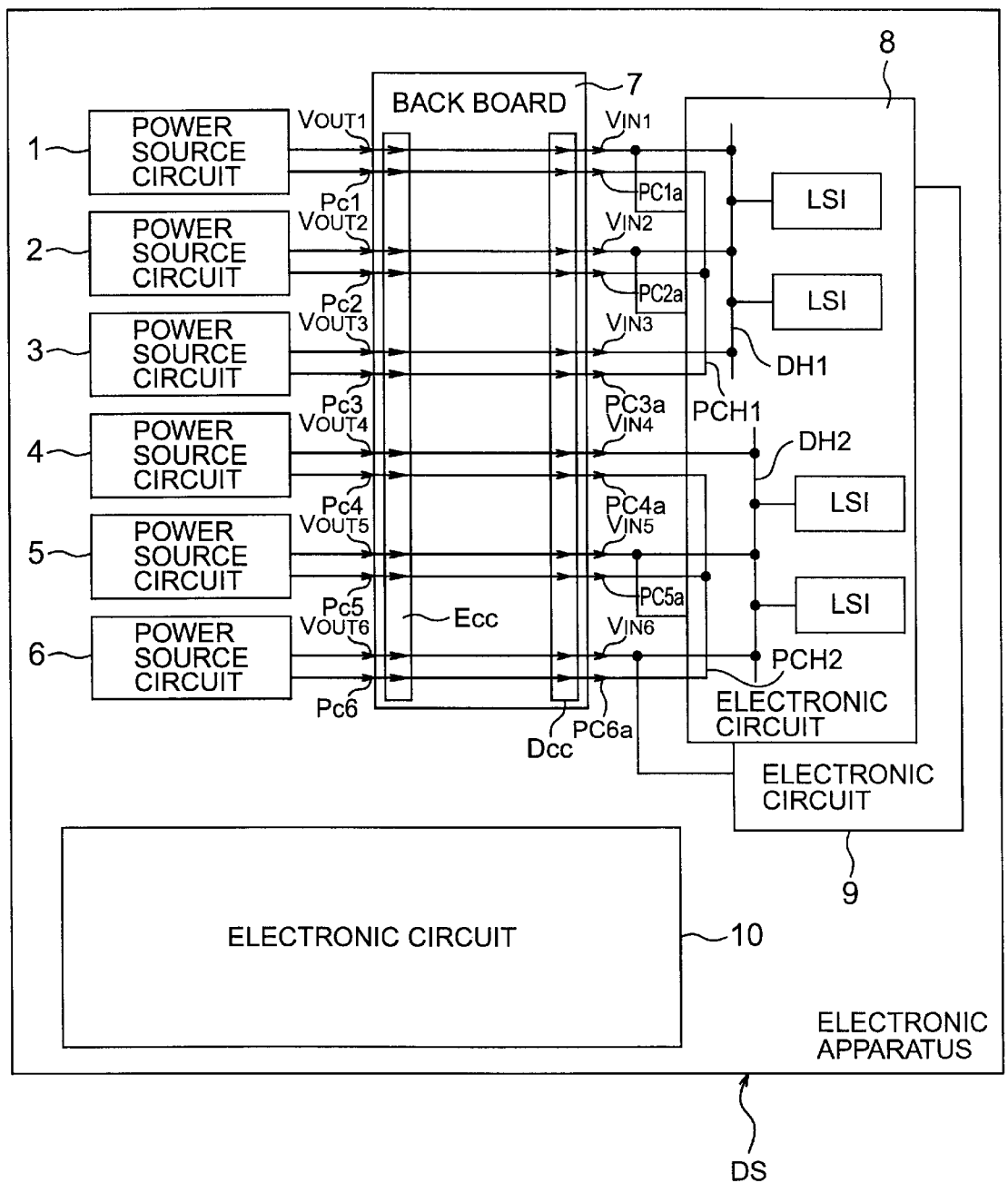
FIG. 3 is a diagram showing the structure of an electronic apparatus using the parallel power system shown in FIG. 1.

FIG. 1 is a diagram showing the structure of a parallel power system according to a first embodiment of the invention, FIG. 2 is a diagram showing the structure of the parallel power system whose current capacity specification is changed, and FIG. 3 is a diagram showing the structure of an electronic apparatus using the parallel power system shown in FIG. 1.

As shown in FIG. 1, the parallel power system of the first embodiment is constituted of power source circuits 1 to 6, a back board (relay board) 7 and an electronic circuit 8. Each of the power source circuits 1 to 6 has electronic components constituting the power source circuit mounted on a printed circuit board (power source wiring board), and supplies power stably to the electronic circuit 8 as a load.

The power source circuits 1 to 6 have power source terminals (power source circuit side terminals) $V_{OUT}1$ to $V_{OUT}6$ and parallel operation control terminals (power source circuit side monitor terminals) PC1 to PC6 which are used as the terminals for monitoring the operation balance of the power source circuits 1 to 6 by transferring monitor signals via the terminals. Each of the power source circuits 1 to 6 has a mechanism for adjusting an output power supply voltage.

The electronic circuit 8 has four loads such as semiconductor integrated circuit devices (LSI) mounted on a printed circuit board (electronic circuit wiring board). These power source circuits 1 to 6 and electronic circuit 8 are mounted on a back board 7. In place of the semiconductor integrated circuit devices, the load may be other electronic components such as a relay and a motor.

The electronic circuit 8 has power source terminals (electronic circuit side terminals) $V_{IN}1$ to $V_{IN}6$ connected via the back board 7 to the power source terminals $V_{OUT}1$ to $V_{OUT}6$ of the power source circuits 1 to 6 and parallel operation control terminals (electronic circuit side monitor terminals) PC1a to PC6a connected via the back board to the parallel operation control terminals PC1 to PC6 of the power source circuits 1 to 6.

The electronic circuit 8 has: a power source line (power source common line) DH1 for supplying power by connecting the power source terminals $V_{IN}1$ to $V_{IN}3$ in common; a power source line (power source common line) DH2 for supplying power by connecting the power source terminals $V_{IN}4$ to $V_{IN}6$ in common; a parallel operation control line (common monitor line) PCH1 for connecting the parallel operation control terminals PC1a to PC3a in common; and a parallel operation control line (common monitor line) PCH2 for connecting the parallel operation control terminals PC4a to PC6a in common.

The back board 7 has: a connector (power source connector) ECC connected to which are the power source terminals $V_{OUT}1$ to $V_{OUT}6$ and parallel operation control terminals PC1 to PC6 of the power source circuits 1 to 6; and a connector (electronic circuit connector) DCC connected to which are the power source terminals $V_{IN}1$ to $V_{IN}6$ and parallel operation control terminals PC1a to PC6a of the electronic circuit 8. The power source circuits 1 to 6 and electronic circuit 8 are plugged into the connectors ECC and DCC.

Lines (feeder lines) HP for interconnecting the connectors DCC and ECC are wired on the back board 7. Each line HP connects corresponding ones of the power source terminals $V_{OUT}1$ to $V_{OUT}6$ and power source terminals $V_{IN}1$ to $V_{IN}6$, and corresponding ones of the parallel operation control terminals PC1 to PC6 and parallel operation control terminals PC1a to PC6a.

As described above, the lines HP of the back board 7 are used for connecting terminals in one-to-one correspondence and do not connect the outputs of the power source circuits 1 to 6 in parallel.

On the printed circuit board of the electronic circuit 8, the power source line DH1 connects the power source circuits 1 to 3 in parallel to constitute a first voltage channel, and the power source line DH2 connects the power source circuits 4 to 6 in parallel to constitute a second voltage channel.

Next, specification change in the parallel power system of this embodiment will be described.

In the following, it is assumed that the specification of the parallel power system is requested to be changed, that the current capacity of the first voltage channel is changed from 30 A to 40 A, and that the current capacity of the second voltage channel is changed from 30 A to 20 A. It is assumed that the current capacity of each of the power source circuits 1 to 6 is 10 A so that the current capacity of each of the first and second voltage channels is 30 A.

First, when the specification change in the current capacity of the parallel power system is to be made, as shown in FIG. 2 the first voltage channel is changed to parallel operation of the power source circuits 1 to 4, and the second voltage channel is changed to parallel operation of the power source circuits 5 and 6.

In this case, the parallel connection of the power source circuits 1 to 6 is established not on the back board 7 but by the power source lines DH1 and DH2 of the electronic circuit 8. Since the electronic circuit 8 is required to change the specification of the current capacity, when this specification is to be changed, wiring of the power source lines DH1 and DH2 and parallel operation control lines PCH1 and PCH2 are changed.

The current capacities of the first and second voltage channels can therefore be changed easily and in short time. It is possible to considerably reduce a cost and time for changing the specification of the parallel power system.

More specifically, the power source lines DH1 and DH2 and parallel operation control lines PCH1 and PCH2 of the electronic circuit 8 are changed to establish the parallel connection of the power source circuits 1 to 6. Accordingly, the change design of parallel connection is allowed to be performed at the same time when the electronic circuit with a specification change is designed again. Cost of the design change caused by the specification change of the parallel power system is very small.

Since the electronic circuit 8 has electronic components mounted on the printed circuit board, an increase in the manufacture cost accompanied by the specification change of the parallel power system is effectively zero.

No alteration or replacement work by a specification change is required excepting the above-described operation, and the specification change of the parallel power system can be realized without discarding the system even if the back board 7 and the like are located at a deeper position and alteration and replacement are impossible.

FIG. 3 shows an example of an electronic apparatus DS using a parallel power system. This electronic apparatus DS has, in addition to an electronic circuit 8, an electronic circuit 9 whose power is supplied from the parallel power system, and an electronic circuit 10 having various peripheral circuits.

If a specification change of the parallel power system of the electronic apparatus DS constructed as above occurs, it is obvious that the cost and time for a change in the specification of the parallel power system can be minimized, while discarding the electronic apparatus DS and other necessary works are avoided.

According to the first embodiment, the specification change of the current capacity can be realized only by changing wiring of the power source lines DH1 and DH2 and parallel operation control lines PCH1 and PCH2 of the electronic circuit 8 and the alteration of the power source circuits 1 to 6 and back board 7 are not necessary. The cost and time for a change in the specification of the parallel power system can be reduced considerably.

According to the first embodiment, the current capacity of the first voltage channel is changed to 40 A and the current capacity of the second voltage channel is changed to 20 A. If the current capacity of the second voltage channel is reduced from 30 A to 20 A and a new third voltage channel is to be installed, this specification change can be realized by changing the parallel connection of the electronic circuit 8 as shown in FIG. 4.

Figure 4:
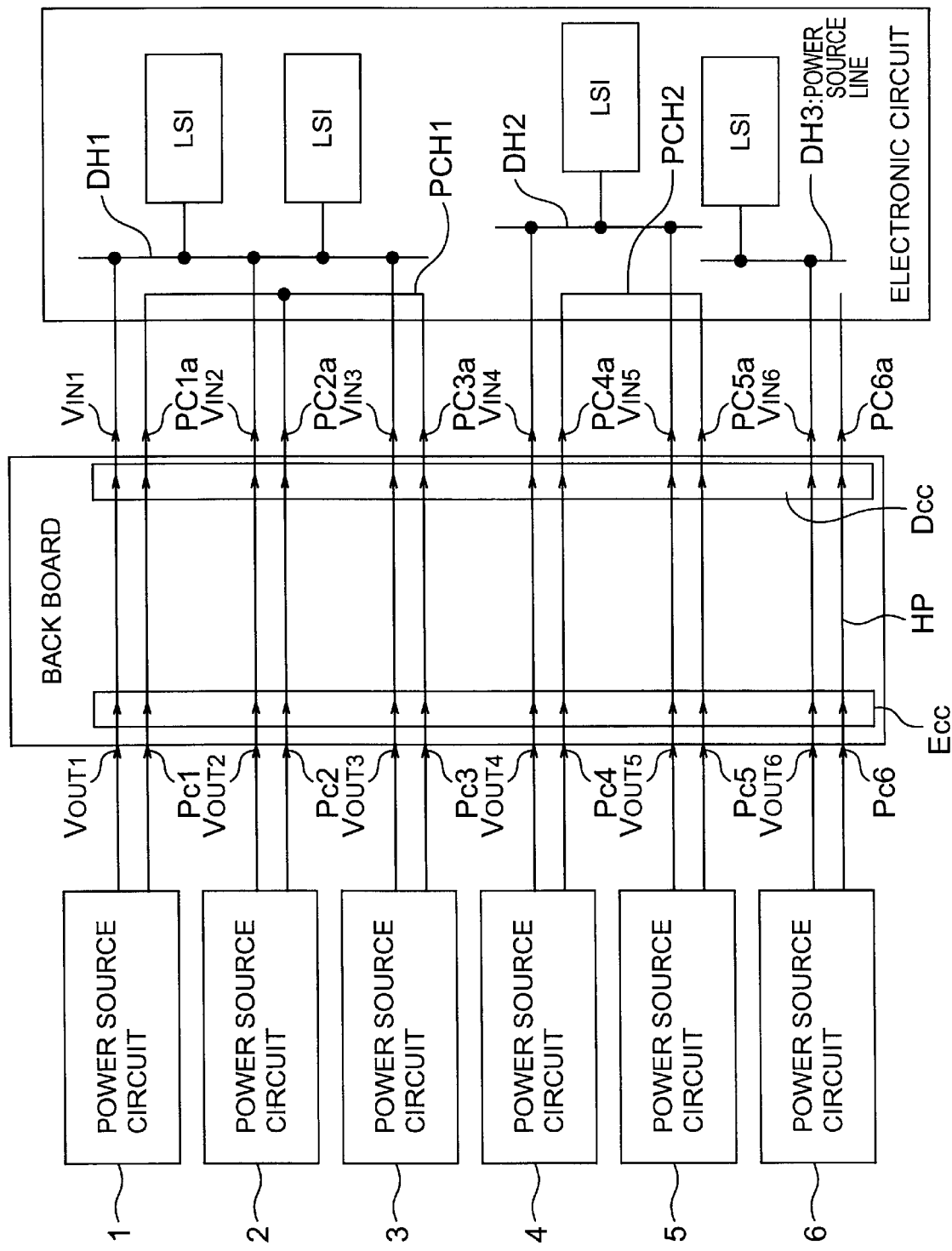
FIG. 4 is a diagram showing the structure of a parallel power system according to another embodiment of the invention.

More specifically, as shown in FIG. 4 the first voltage channel is changed to parallel operation of the power source circuits 1 to 3, the second voltage channel is changed to parallel operation of the power source circuits 4 and 5, and the power source circuit 6 operating singularly constitutes a third voltage channel for supplying power.

In this case, a power source line DH3 for supplying power is newly formed in the electronic circuit 8 as the third voltage channel. Similar to the specification change described above, only the electronic circuit 8 can realize the specification change of the current capacity. It is therefore possible to avoid discarding the apparatus and minimize the cost and time for the change in the parallel power system accompanied by the specification change.

Figure 5:
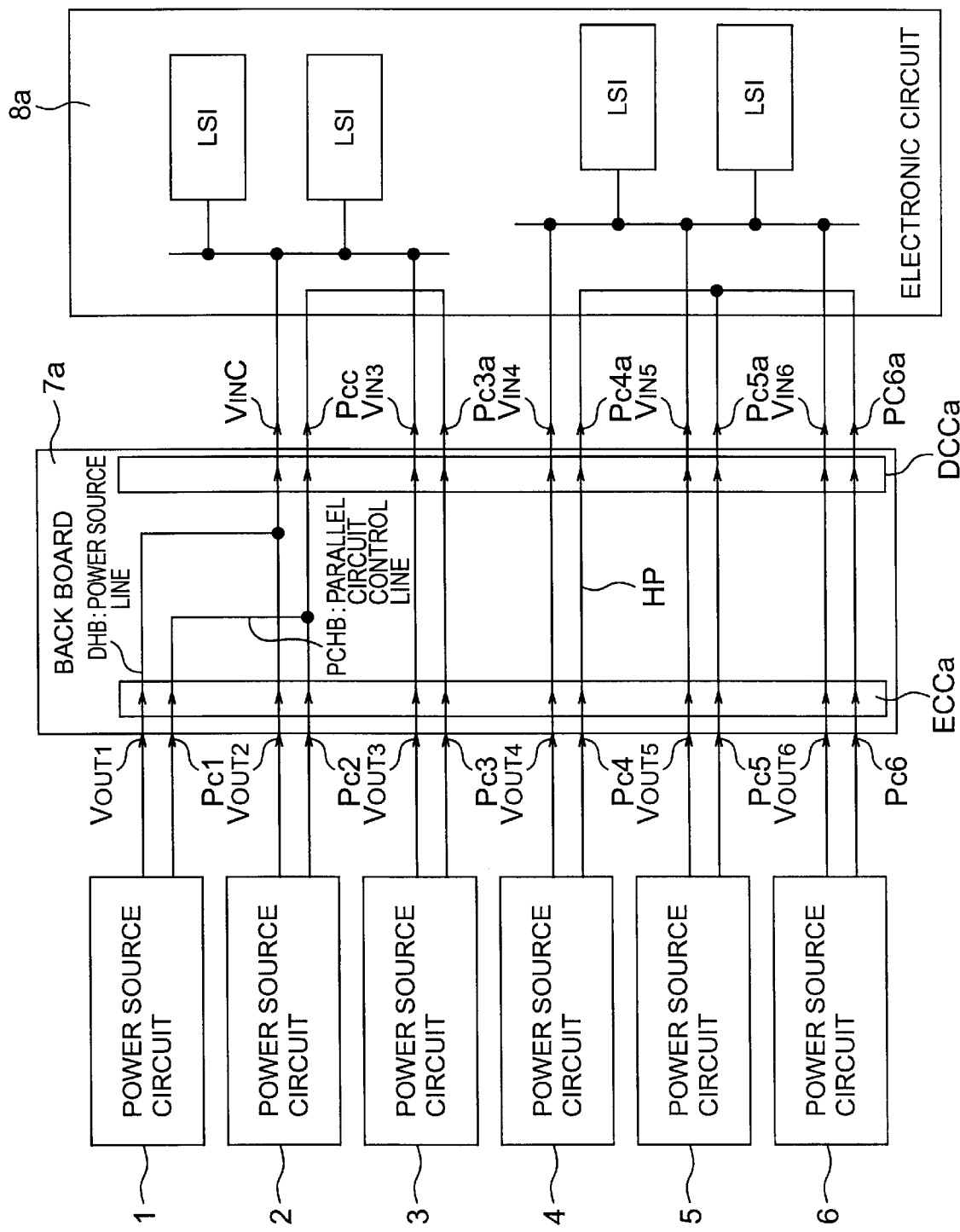
FIG. 5 is a diagram showing the structure of a parallel power system according to a second embodiment of the invention.

FIG. 5 is a diagram showing the structure of a parallel power system according to a second embodiment of the invention.

Similar to the first embodiment, the parallel power system of the second embodiment is constituted of power source circuits 1 to 6 having power source terminals $V_{OUT}1$ to $V_{OUT}6$ and parallel operation control terminals PC1 to PC6, a back board (relay board) 7a and an electronic circuit 8a.

The electronic circuit 8a has: a power source terminal $V_{IN}2$ in place of the power source terminals $V_{IN}1$ and $V_{IN}2$; power source terminals $V_{IN}3$ to $V_{IN}6$; a parallel operation control terminal (electronic circuit side monitor terminal) PCC in place of the parallel operation control terminals PC1a and PC2a; and parallel operation control terminals PC3a to PC6a.

The back board 7a has: a connector (power source connector) ECCa connected to which are the power source terminals $V_{OUT}1$ to $V_{OUT}6$ and parallel operation control terminals PC1 to PC6; and a connector (electronic circuit connector) DCCa connected to which are the power source terminals $V_{IN}C$, and $V_{IN}3$ to $V_{IN}6$ and parallel operation control terminals PCC, and PC3a to PC6a.

The back board 7a has a power source line (relay board common line) DHB and a parallel operation control line (relay board common monitor line) PCHB for parallel connection of the power source terminals $V_{OUT}1$ and $V_{OUT}2$ and parallel operation control terminals PC1 and PC2 of the power source circuits 1 and 2, respectively.

The power source terminals $V_{OUT}1$ and $V_{OUT}2$ of the power source circuits 1 and 2 are connected in parallel by the power source line DHB which is connected to the power source terminal $V_{IN}C$ of the electronic circuit 8a.

The parallel operation control terminals PC1 and PC2 are connected in parallel by the parallel operation control terminal PCHB which is connected to the parallel operation control terminal PCC of the electronic circuit 8a.

As above, if it can be known beforehand that some portion of the power system is not changed, a power source line DHB and parallel operation control line PCHB may be formed on the back board 7a for parallel connection of any ones of the power source terminals $V_{OUT}1$ to $V_{OUT}6$ and parallel operation control terminals PC1 to PC6.

Similar to the first embodiment, also in the second embodiment, only the electronic circuit 8 which issued a request for the specification change of the current capacity can realize the change. It is therefore possible to avoid discarding the apparatus and minimize the cost and time for the change in the parallel power system accompanied by the specification change.

Figure 6:
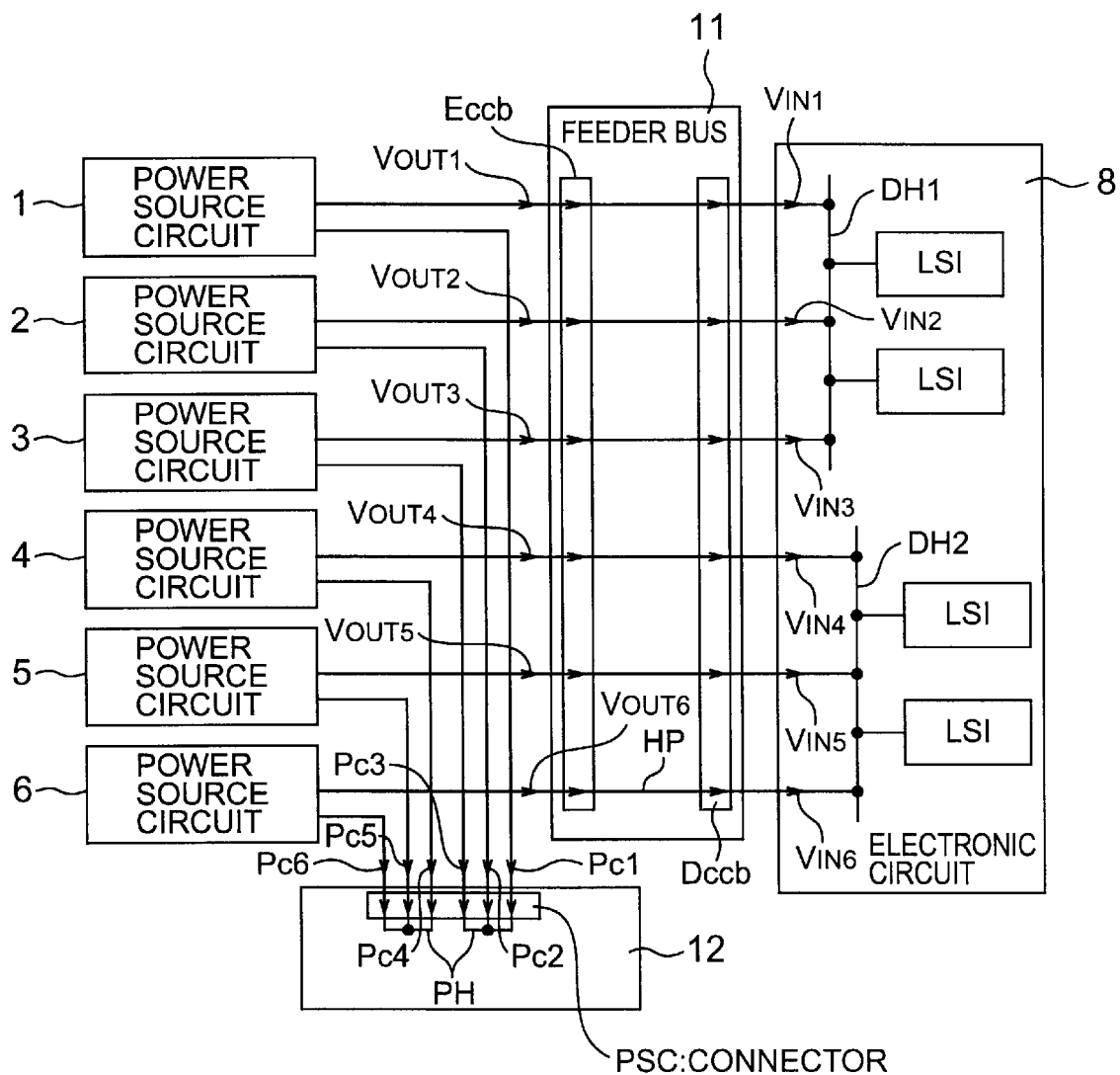
FIG. 6 is a diagram showing the structure of a parallel power system according to a third embodiment of the invention.

FIG. 6 is a diagram showing the structure of a parallel power system according to a third embodiment of the invention.

In the third embodiment, the parallel power system is constituted of power source circuits 1 to 6 having power source terminals $V_{OUT}1$ to $V_{OUT}6$ and parallel operation control terminals PC1 to PC6, a feeder bus 11, a parallel connection unit (parallel wiring unit) 12, power source terminals $V_{IN}1$ to $V_{IN}6$, and an electronic circuit 8.

The feeder bus 11 is used if the current capacity is large and the current capacity of the back board made of a printed circuit board is insufficient. The parallel connection unit 12 is made of a printed circuit or the like.

The feeder bus 11 is provided with a connector (power source connector) ECCb for connection to the power source terminals $V_{OUT}1$ to $V_{OUT}6$ of the power source circuits 1 to 6 and a connector (electronic circuit connector) DCCb for connection to the power source terminals $V_{IN}1$ to $V_{IN}6$ of the electronic circuit 8. The power source circuits 1 to 6 and electronic circuit 8 are plugged in the connectors ECCb and DCCb.

The parallel connection unit 12 is provided with a connector PSC for connection to the parallel operation control terminals PC1 to PC6 of the power source circuits 1 to 6. There are one or plural sets of the terminals of the connector PSC that are connected in common by lines PH of the parallel connector unit 12.

The electronic circuit 8 is provided with a power source line DH1 for supplying power to loads via the power source terminals $V_{IN}1$ to $V_{IN}3$ and a power source line DH2 for supplying power to loads via the power source terminals $V_{IN}4$ to $V_{IN}6$.

If the specification change of the parallel power system occurs, the electronic circuit 8 as well as the power source lines DH1 and DH2 are changed in accordance with the contents of the specification change. It is therefore possible to avoid alteration or discarding of the power source circuits 1 to 6, feeder line 11 and the electronic circuit.

A change of the parallel connection unit 12 which may occur because of the specification change can be performed at low cost by designing the parallel connection unit 12 so as to make the change economically. If replacement of the parallel connection unit 12 is made with the connector PSC or by using hardware or software control switches, replacement or alteration can be made easy and the replacement or alteration time can be shortened.

Also in the third embodiment, it is possible to reduce the cost and shorten the time for the change accompanied by the specification change of the parallel power system.

According to the third embodiment, although the power source circuits 1 to 6 and electronic circuit 8 are connected by using the feeder bus 11, a back board may be used in place of the feeder bus 11.

The parallel connection unit 12 may be formed on a printed circuit board different from the electronic circuit, to consider the unit 12 as part of the electronic circuit. This approach is effective if there are a plurality of electronic circuits and if it is not beneficial to fixedly provide only a single electronic circuit with parallel connection points.

Figure 7:
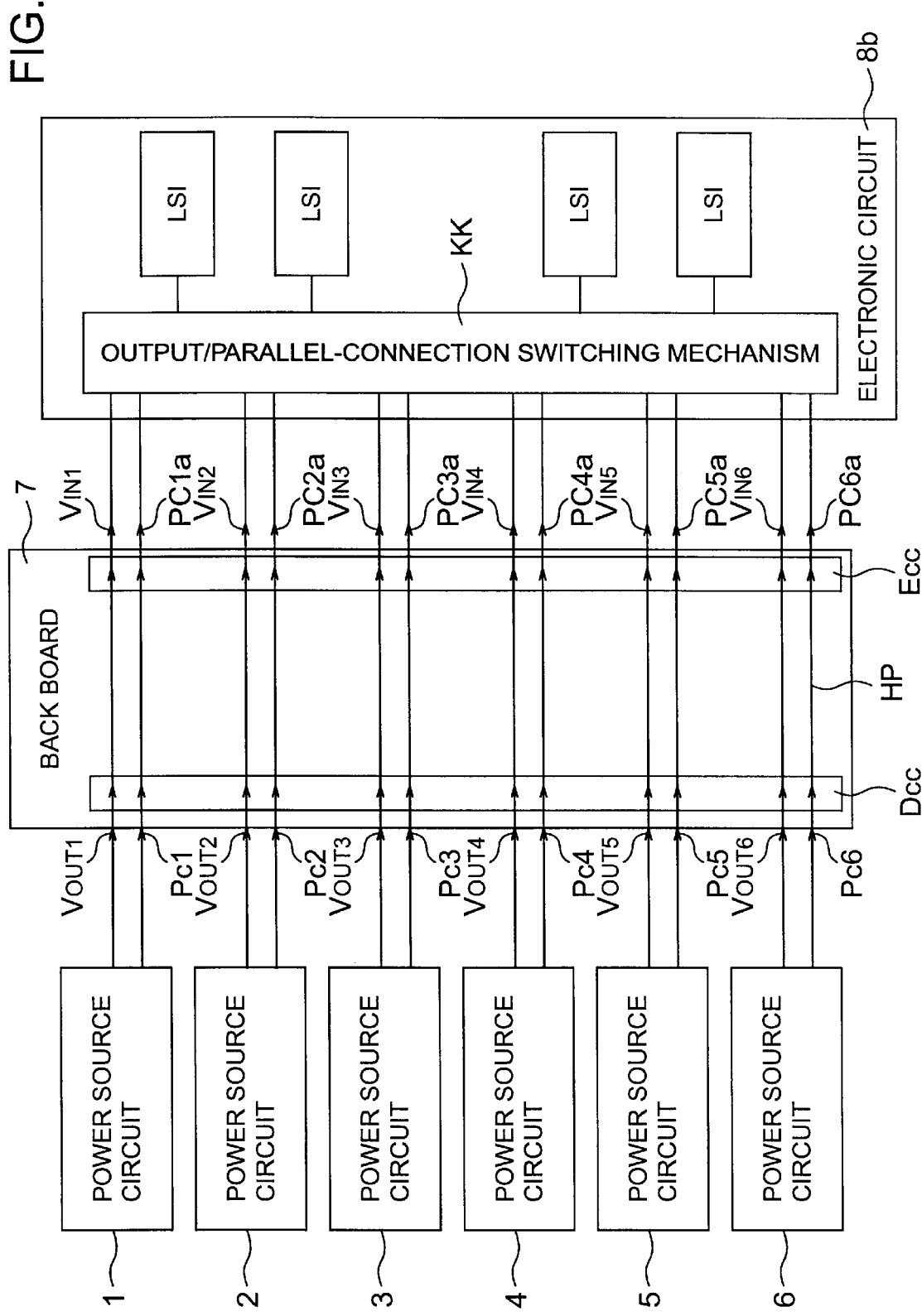
FIG. 7 is a diagram showing the structure of a parallel power system according to a fourth embodiment of the invention.

FIG. 7 is a diagram showing the structure of a parallel power system according to a fourth embodiment of the invention.

In the fourth embodiment, the parallel power system is constituted of power source circuits 1 to 6 having power source terminals $V_{OUT}1$ to $V_{OUT}6$ and parallel operation control terminals PC1 to PC6, a back board 7 having connectors DCC and ECC and lines HP, and an electronic circuit 8b.

The structure of the electronic circuits 1 to 6 and back board 7 are similar to that of the first embodiment, excepting that the electronic circuit 8b is provided with an output/parallel-connection switching mechanism (connection switching means) KK.

The output/parallel-connection switching mechanism KK is made of switching means such as switching transistors. The connection destinations of switching means are changed in accordance with setting information to change combinations of power source circuits 1 to 6 in parallel operation in response to a specification change of the parallel power system. Setting information may be changed by hardware or software switches or other means.

The cost and time for a specification change of the parallel power system can be minimized. In addition, since the specification change of the parallel power system can be made only by the setting information, the cost and time can be further minimized.

According to the fourth embodiment, when a specification change of the parallel power system occurs, the cost and time for a change in the specification of the parallel power system can be minimized, while discarding the electronic apparatus and other necessary works are avoided.

In the fourth embodiment, the output/parallel-connection switching mechanism KK is provided in place of the power source lines DH1 and DH2 and parallel operation control lines PCH1 and PCH2 of the parallel power system shown in FIG. 1. The output/parallel-connection switching mechanism KK may be provided in place of the power source lines and parallel operation control lines of a parallel power system of any one of other embodiments, with similar advantageous effects.

The invention is not limited only to the above-described embodiments, but it is obvious that various modifications are possible without departing from the spirit and features of the invention.

In the first to fourth embodiments, although the power source circuits and electronic circuit are plugged in the back board or feeder bus, they may be plugged in other devices such as a computer mother board, with similar advantageous effects.

In the first to fourth embodiments, although the current capacity of each power source circuit is assumed to have the same capacity, different current capacities may also be used. For example, if power source circuits having different current capacities of 10 A and 5 A are used, a fine specification change in the unit of 5 A can be made.

According to the invention, even if a specification change of the parallel power system occurs, the back board and an electronic circuit not changed can be used as they are. It is therefore possible to considerably reduce the cost and shorten the time for the specification change of the parallel power system.

According to the invention, since discarding an electronic apparatus using a parallel power system can be avoided, the lifetime of the electronic apparatus can be prolonged.

What is claimed is:

1. A parallel power system comprising:
a plurality of power source wiring boards each having a power source circuit for outputting a predetermined power supply voltage and a power source circuit side terminal via which the power supply voltage output from the power source circuit is output;
an electronic circuit wiring board having electronic circuit side terminals to which the power supply voltages output from the power supply circuits are input, wherein an electronic circuit is formed by loads; and a relay board having a power source connector for mounting said plurality of power source wiring boards through insertion of the power source circuit side terminals of said plurality of power source wiring boards, an electronic circuit connector for mounting said electronic circuit wiring board through insertion of the electronic circuit side terminals of said electronic circuit wiring board, and feeder lines for supplying the power supply voltages output from the power source circuits to said electronic circuit wiring board by connecting corresponding ones of power source circuit side terminals of the power source connector and electronic circuit side terminals of the electronic circuit connector, wherein said electronic circuit wiring board has power source common lines for connecting in parallel desired ones of the electronic circuit terminals of the electronic circuit connector to supply the power supply voltages to the loads.

2. A parallel power system comprising:

a plurality of power source wiring boards each having a power source circuit for outputting a predetermined power supply voltage, a power source circuit side terminal via which the power supply voltage output from the power source circuit is output, and a power source circuit side monitor terminal for transferring a monitor signal representative of an operation balance of the power source circuit;

an electronic circuit wiring board having electronic circuit side terminals to which the power supply voltages output from the power supply circuits are input, and electronic circuit side monitor terminals for transferring the monitor signal, wherein an electronic circuit is formed with loads; and a relay board having a power source connector for mounting said plurality of power source wiring boards through insertion of the power source circuit side terminals of said plurality of power source wiring boards and the power source circuit side monitor terminals, an electronic circuit connector for mounting said electronic circuit wiring board through insertion of the electronic circuit side terminals of said electronic circuit wiring board and the electronic circuit side monitor terminals, feeder lines for supplying the power supply voltages output from the power source circuits to said electronic circuit wiring board by connecting corresponding ones of the power source circuit side terminals and the electronic circuit side terminals respectively, and common monitor lines for transferring the monitor signal by connecting corresponding ones of the power source circuit side monitor terminals and the electronic circuit side monitor terminals, wherein said electronic circuit wiring board has power source common lines for connecting in parallel desired ones of electronic circuit terminals of the electronic circuit connector to supply the power supply voltages to the loads, and common monitor lines for connecting in parallel desired ones of electronic circuit side monitor terminals of the electronic circuit connector to transfer the monitor signal.

3. A parallel power system comprising:

a plurality of power source wiring boards each having a power source circuit for outputting a predetermined power supply voltage, a power source circuit side terminal via which the power supply voltage output from the power source circuit is output, and a power source circuit side monitor terminal for transferring a monitor signal representative of an operation balance of the power source circuit;

an electronic circuit wiring board having electronic circuit side terminals to which the power supply voltages output from the power supply circuits are input, and electronic circuit side monitor terminals for transferring the monitor signal, wherein an electronic circuit is formed with loads; and a relay board having a power source connector for mounting said plurality of power source wiring boards through insertion of the power source circuit side terminals of said plurality of power source wiring boards and the power source circuit side monitor terminals, an electronic circuit connector for mounting said electronic circuit wiring board through insertion of the electronic circuit side terminals of said electronic circuit wiring board and the electronic circuit side monitor terminals, feeder lines for supplying the power supply voltages output from the power source circuits to said electronic circuit wiring board by connecting corresponding ones of the power source circuit side terminals and the electronic circuit side terminals respectively, and common monitor lines for transferring the monitor signal by connecting corresponding ones of the power source circuit side monitor terminals and the electronic circuit side monitor terminals, wherein:

said relay board has relay board common lines for connecting in parallel desired electronic circuit side terminals to supply the power supply voltages to the loads, and relay board common monitor lines for connecting in parallel desired electronic circuit side monitor terminals to transfer the monitor signal; and said electronic circuit wiring board has power source command lines for connecting in parallel desired ones of electronic circuit terminals not connected in common by the relay board common lines to supply the power supply voltages to the loads, and common monitor lines for connecting in parallel desired ones of electronic circuit side monitor terminals not connected in common by the relay board common monitor lines.

4. A parallel power system comprising:

a plurality of power source wiring boards each having a power source circuit for outputting a predetermined power supply voltage, a power source circuit side terminal via which the power supply voltage output from the power source circuit is output, and a power source circuit side monitor terminal for transferring a monitor signal representative of an operation balance of the power source circuit;

an electronic circuit wiring board having electronic circuit side terminals to which the power supply voltages output from the power supply circuits are input, and electronic circuit side monitor terminals for transferring the monitor signal, wherein an electronic circuit is formed with loads; and a relay board having a power source connector for mounting said plurality of power source wiring boards through insertion of the power source circuit side terminals of said plurality of power source wiring boards and the power source circuit side monitor terminals, an electronic circuit connector for mounting said electronic circuit wiring board through insertion of the electronic circuit side terminals of said electronic circuit wiring board and the electronic circuit side monitor terminals, feeder lines for supplying the power supply voltages output from the power source circuits to said electronic circuit wiring board by connecting corresponding ones of the power source circuit side terminals and the electronic circuit side terminals respectively, and common monitor lines for transferring the monitor signal by connecting corresponding ones of the power source circuit side monitor terminals and the electronic circuit side monitor terminals, wherein said electronic circuit wiring board has connection switching means for connecting in parallel desired ones of electronic circuit terminals of the electronic circuit connector to supply the power supply voltages to the loads, and connecting in parallel desired ones of electronic circuit side monitor terminals to transfer the monitor signal.

5. A parallel power system comprising:

a plurality of power source wiring boards each having a power source circuit for outputting a predetermined power supply voltage, a power source circuit side terminal via which the power supply voltage output from the power source circuit is output, and a power source circuit side monitor terminal for transferring a monitor signal representative of an operation balance of the power source circuit;

an electronic circuit wiring board having electronic circuit side terminals to which the power supply voltages output from the power supply circuits are input, and electronic circuit side monitor terminals for transferring the monitor signal, wherein an electronic circuit is formed with loads;

a feeder bus having a power source connector for mounting said plurality of power source wiring boards through insertion of the power source circuit side terminals of said plurality of power source wiring boards, an electronic circuit connector for mounting said electronic circuit wiring board through insertion of the electronic circuit side terminals of said electronic circuit wiring board, wherein corresponding ones of the power source circuit side terminals and the electronic circuit side terminals are connected respectively to supply the power supply voltages output from the power source circuits to said electronic circuit wiring board; and a parallel wiring unit for connecting in parallel corresponding ones of the power source circuit side monitor terminals and the electronic circuit side monitor terminals, wherein said electronic circuit wiring board has power source common lines for connecting in parallel desired ones of electronic circuit terminals of the electronic circuit connector to supply the power supply voltages to the loads, and common monitor lines for connecting in parallel desired ones of electronic circuit side monitor terminals of the electronic circuit connector to transfer the monitor signal.

6. An electronic apparatus equipped with the parallel power system of claim 1.

7. A parallel power system having a plurality of power source circuits and an electronic circuit mounted on a back board, the power outputs of the plurality of power source circuits being connected in parallel to supply power to the electronic circuit, wherein:

said back board has a plurality of feeder lines for supplying each power output of the plurality of power source circuits independently to said electronic circuit; and said electronic circuit has power source lines for connecting in common desired ones of the plurality of feeder lines of said back board.

8. A parallel power system according to claim 7, wherein the plurality of power source circuits are divided into a plurality of groups, and the electronic circuit has power source lines in correspondence with respective groups.

9. A parallel power system according to claim 8, wherein the plurality of power source circuits are divided into a plurality of groups having different power supply output voltages, and the electronic circuit has power source lines for different power supply output voltages in correspondence with respective groups.

10. A parallel power system according to claim 7, wherein:

each of the plurality of power source circuits has a function of outputting a control signal for controlling a parallel operation;

said back board has a plurality of signal lines for transferring a control signal for each of the plurality of power source circuits independently to said electronic circuit; and said electronic circuit has a control line for connecting in common the plurality of signal lines of said back board.

11. A parallel power system according to claim 7, wherein said electronic circuit has one, two or more semiconductor integrated circuits.

12. A parallel power system according to claim 7 wherein said electronic circuit is made of one, two or more circuit boards.

13. An electronic apparatus equipped with the parallel power system of claim 7.

14. A system for connecting a plurality of power supply circuits in parallel, each of said power supply circuits having at least one power output terminal, said system comprising:

at least one electronic circuit having power input terminals, a back board having said power supply circuits and said electronic circuit connected onto, and having power lines that connect said power output terminals of said power supply circuits to said power input terminals of said electronic circuit respectively, wherein said electronic circuit has at least one common power line for providing common connection of said output terminals for said power supply circuits for the power supply circuits to operate in parallel.

15. The system according to claim 14 wherein said power supply circuits include an operation control terminal for parallel operation of said power supply circuits, said back board includes operation control lines that connect said operation control terminals of said power supply circuits to said electronic circuit, said electronic circuit has at least one common operation control line for providing common connection of said operation control terminals of said power supply circuits for said power supply circuits to operate in parallel.

16. The system according to claim 15 wherein said back board includes back board common power lines for connecting in common desired power output terminals of said power supply circuits and back board common operation control lines for connecting in common desired operation control terminals of said power supply circuits.

* * * * *